(12) United States Patent
Chan et al.

(10) Patent No.: US 12,158,692 B2
(45) Date of Patent: *Dec. 3, 2024

(54) ADJUSTABLE PLATE FOR CAMERA EQUIPMENT

(71) Applicant: Really Right Stuff, LLC, Lehi, UT (US)

(72) Inventors: Verent Chan, Lehi, UT (US); Joseph M. Johnson, Sr., Lehi, UT (US); Ricky Wai, Lehi, UT (US)

(73) Assignee: Really Right Stuff LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,340

(22) Filed: Nov. 30, 2023

(65) Prior Publication Data

US 2024/0094610 A1    Mar. 21, 2024

Related U.S. Application Data

(63) Continuation of application No. 18/052,111, filed on Nov. 2, 2022, now Pat. No. 11,880,121, which is a continuation of application No. 17/474,911, filed on Sep. 14, 2021, now Pat. No. 11,550,208.

(60) Provisional application No. 63/151,424, filed on Feb. 19, 2021.

(51) Int. Cl.
    *G03B 17/56*    (2021.01)
(52) U.S. Cl.
    CPC .................... *G03B 17/561* (2013.01)

(58) Field of Classification Search
    CPC .... G03B 17/561; G03B 17/566; F16M 11/04; F16M 11/041; F16M 13/00; F16M 13/022
    See application file for complete search history.

(56) References Cited

U.S. PATENT DOCUMENTS

| | | | |
|---|---|---|---|
| 6,773,172 B1 | 8/2004 | Johnson et al. | |
| 6,779,932 B2 | 8/2004 | DeSorbo et al. | |
| 9,372,383 B2 | 6/2016 | Johnson | |
| 11,092,882 B2 | 8/2021 | Fliger | |
| 11,550,208 B2 | 1/2023 | Johnson et al. | |
| 11,880,121 B2* | 1/2024 | Chan .................... | G03B 17/561 |
| 2017/0003577 A1 | 1/2017 | Johnson | |
| 2017/0314726 A1 | 11/2017 | Johnson, Sr | |
| 2022/0269151 A1 | 8/2022 | Chan et al. | |

FOREIGN PATENT DOCUMENTS

| | | |
|---|---|---|
| CN | 201489252 U | 5/2010 |
| CN | 204268003 U | 4/2015 |
| KR | 200486914 Y1 | 7/2018 |

OTHER PUBLICATIONS

3 Legged Thing, Amazon, https://www.3leggedthing.com/uk/blog/3-legged-thing-announces-new-legends-tripod-range.html.
Leofoto LPC-R5, Dedicated L Plate for Canon EOS R5 R6 Camera Arca Compatible, Amazon.com; Leofoto LPC-R5 Dedicated L Plate for Canon EOS R5 R6 Camera Arca Compatible; Electronics.

* cited by examiner

*Primary Examiner* — Christopher E Mahoney
(74) *Attorney, Agent, or Firm* — Chernoff, Vilhauer, McClung & Stenzel LLP

(57) ABSTRACT

A plate for an imaging device.

11 Claims, 27 Drawing Sheets

ADJUSTABLE PLATE FOR CAMERA EQUIPMENT

CROSS-REFERENCE TO RELATED APPLICATIONS

This application is a continuation of U.S. patent application Ser. No. 18/052,111, filed Nov. 2, 2022, which is a continuation of U.S. patent application Ser. No. 17/474,911, filed Sep. 14, 2021, now U.S. Pat. No. 11,550,208, issued Jan. 10, 2023, which claims the benefit of U.S. Provisional Patent Application No. 63/151,424, filed Feb. 19, 2021.

BACKGROUND OF THE INVENTION

The present invention relates to a bracket suitable for interconnecting camera equipment and a support for camera equipment.

Camera equipment often includes a threaded receptacle for attaching the equipment to a head mount of a tripod, monopod or other support. A camera may be attached directly to a head mount of a support by a screw projecting from the head mount but a quick-release mounting system is commonly used to secure camera equipment, particularly higher end camera equipment, to a tripod or other support. A quick-release camera mounting system typically includes a plate that is securable to the camera' body by a screw that is engageable with the threaded receptacle in the bottom of the camera. The screw projecting from the head mount provides a means of securing a receiver to the tripod or other camera support. A projection or taper of the camera plate engages a complementary groove or taper of the receiver and the camera plate is typically secured in the receiver by a clamp or other quick-release mechanism. For example, many makers of photographic equipment utilize a quick-release system developed by camera equipment maker Arca-Swiss, International. The Arca-Swiss or arca-type quick-release system utilizes a dovetail tenon in the form of a 38 mm wide plate having at least two opposing edges sloping at 45 degrees. The plate is receivable and securable in a receiver by opposing sloping dovetail surfaces of a clamp, usually operable by a lever or screw, such as the quick-release clamp described in U.S. Pat. No. 6,773,172. The receiver may be attached to the head mount or, more commonly, to an intermediate attaching device, such as a ballhead, pan head or gimbal head, affixed to the head mount.

A ballhead typically comprises a ball which has a radially projecting stem and which is supported in a socket in the ballhead's body. The body of the ballhead is secured to the head mount of a tripod or other support by the screw projecting from the head mount and engaging a threaded aperture in the bottom of the ballhead's body. Camera equipment or a receiver, such as a clamp of a quick-release system, is attached to the end of the stem projecting from the ball by a screw threaded into a longitudinally extending aperture in the stem. The ball and socket joint enables rotation of the ball in the body of the ballhead and the body, typically, includes a mechanism enabling constriction of the socket to lock the ball and the attached camera equipment in a desired attitude relative to the support. While the ball can be rotated 360° around the longitudinal axis of the stem, rotation in directions transverse to the axis of the stem is limited by interference between the stem and the edge of the ballhead's body.

The body of a ballhead may include one or more drop notches providing clearance for the stem to rotate 90° in a direction transverse to the axis of the stem enabling the camera equipment to be moved from a landscape orientation to a portrait orientation and vice versa. Changing the orientation of camera equipment attached to a ballhead from landscape to portrait or vice versa can be problematic. The camera equipment is offset relative to the center of rotation of the ball and as the ball is rotated in directions transverse to the longitudinal axis of the stem the camera shifts both horizontally and vertically. If the camera equipment is heavy, the horizontal movement of the weight may destabilize the support and the vertical displacement of the camera may make using the viewfinder difficult. In addition, shifting the location of the camera's lens will change the setup for the shot particularly if the subject is close, for example, when shooting a macro. It may be necessary to move the tripod to compensate for the change in the relative positions of the camera and the subject. In addition, if the support is not sitting on a level surface, it may not be possible to rotate the ball far enough to attain the portrait orientation before the stem of the ball makes contact with the bottom of the drop notch.

Attaching camera equipment to a support with an L-plate or L-bracket avoids the need to utilize a ballhead drop notch when switching a supported camera from landscape orientation to portrait orientation or vice versa. An L-plate includes a first portion attachable to the bottom of the camera's body and a second portion partially wrapping around the camera's body to extend normal to the first portion and parallel to the side of the camera's body. Each portion of the L-plate includes a retention feature, for example, a tenon of a dovetail, enabling engagement with a receiver portion, for example, an Arca-Swiss type quick-release clamp, when the camera equipment is in either one of the two perpendicular photographic orientations. To switch a camera from a landscape orientation to a portrait orientation, the photographer releases the quick-release device, rotates the camera ninety degrees, and engages and locks the mounting feature of the second portion of the L-plate in the receiver of the quick release system. The camera's lens is, typically, substantially centered with respect to the longitudinal axis of the L-plate's two mounting features and movement of the lens relative to the head mount of the support is minimized when the camera's orientation is changed.

While an L-plate facilitates photography with a tripod, monopod or other support, use of an L-plate with a digital camera can be problematic. Digital cameras are commonly connectable to remote devices, such as a computer, a printer or a video monitor, for downloading and viewing images and video captured with the camera. In addition, remote accessories, such as a microphone, a flash unit or a remote shutter control switch, may be connected to the camera. The connectors for the cable assemblies connecting these remote devices to the camera are commonly located behind one or more doors on the side of the camera's body and when the L-plate and camera are turned for the portrait orientation, there is, typically, insufficient distance between the body of the camera and the L-plate and/or the receiver of the quick-release system to accommodate passage of the cable assembly(ies) connecting the camera to the remote device (s). A cable relief spacer may be inserted between the L-plate and the receiver to provide clearance for connectors and cables but this is, typically, a small, loose piece which can be easily misplaced and may not be carried with the camera equipment and, therefore, may be unavailable when needed. Also, the interconnection of the L-plate to the camera tends to be awkward, and the adjustment of the L-plate tends to be limited and complicated, and the L-plate tends to increase the instability to supporting the camera.

What is desired therefore is a mounting device that permits the orientation of supported camera equipment to be changed in a more efficient manner that does not unduly increase the instability to supporting the camera.

DETAILED DESCRIPTION OF PREFERRED EMBODIMENTS

Figure 1:
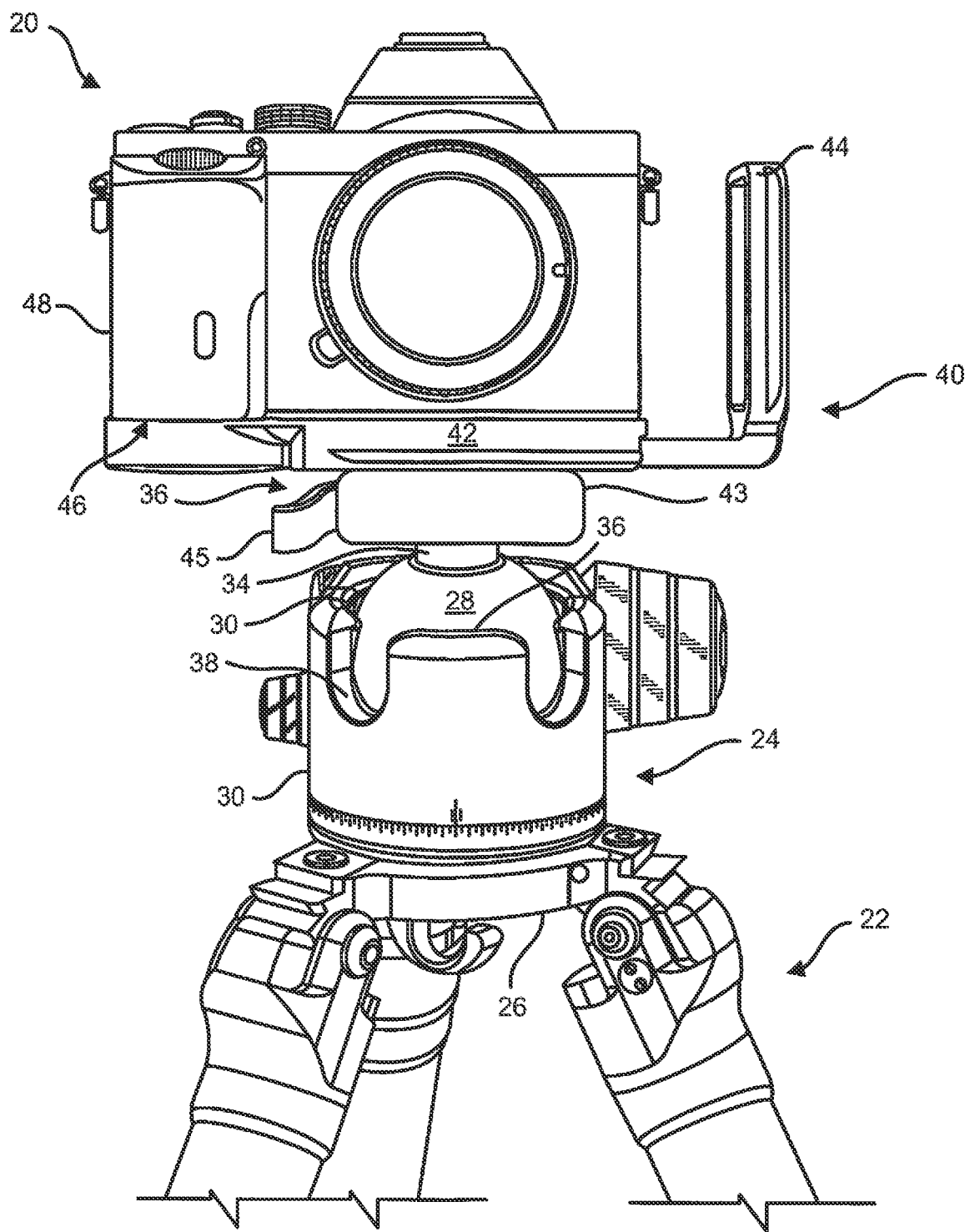
FIG. 1 illustrates a front elevation view of a camera attached in a landscape orientation to a tripod mounted ball head with an extendible L-plate.

Referring in detail to the drawings where similar parts are identified by like reference numerals, and, more particularly to FIG. 1, to provide stability and to reduce blurring, photographic equipment 20, for example, a camera body 48, a lens and one or more accessories, is often affixed to a support, such as a tripod 22 or monopod. While camera equipment 20 can be attached directly to a tripod 22 or other support, cameras are commonly affixed to a support with an intermediate device, such as a ballhead 24, pan head or gimbal head which is usually secured to the head mount 26 of the support by a screw that projects upward through the head mount into threaded engagement with a threaded aperture in the body of the intermediate device. A ballhead 24 comprises generally a ball 28 which is retained in a socket 30 in the ballhead's body 32. The ball 28 typically includes a radially projecting stem 34 to which the photographic equipment or a receiver of a quick-release system is attached. The ball-in-socket joint enables unlimited rotation of the ball about the longitudinal axis of the stem 34 and limited rotation of the ball in directions transverse to the stem's axis. The ballhead's body 32 typically includes a mechanism enabling constriction of the socket to hold the ball and the camera equipment in a position desired by the photographer.

Rotation of the ball 28 in directions transverse to the longitudinal axis of the stem 34, is limited by interference between the stem and the upper edge 36 of the ballhead's body. The bodies of many ballheads include one or more drop notches 38 in the upper surface of the body to provide additional clearance for the stem enabling the orientation of the camera to be shifted between a landscape orientation with the lower surface 46 of the camera's body 48 arranged substantially horizontal and a portrait orientation with the lower surface arranged substantially vertical. However, utilizing a drop notch of a ballhead to change camera orientation can be problematic because the location of the lens and the center of mass of the photographic equipment move horizontally and vertically as the camera is rotated about the center of the ball in directions transverse to the longitudinal axis of the stem. This can cause the support to become unstable and may substantially alter the setup of a shot, particularly when the subject to be photographed and the camera are close to each other.

Figure 2:
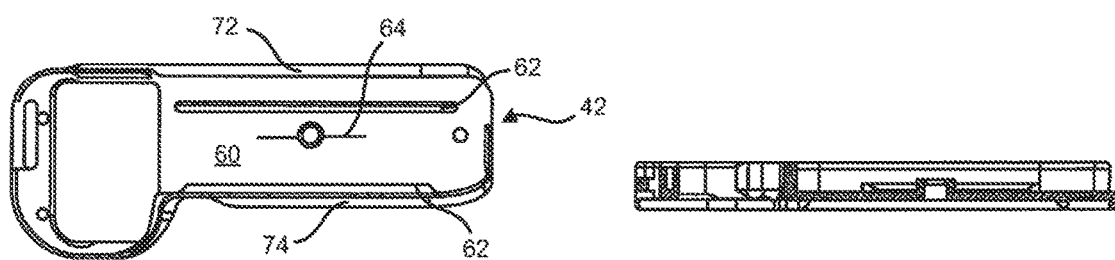
FIG. 2 illustrates a top view and side view of the L-plate.
Figure 3:
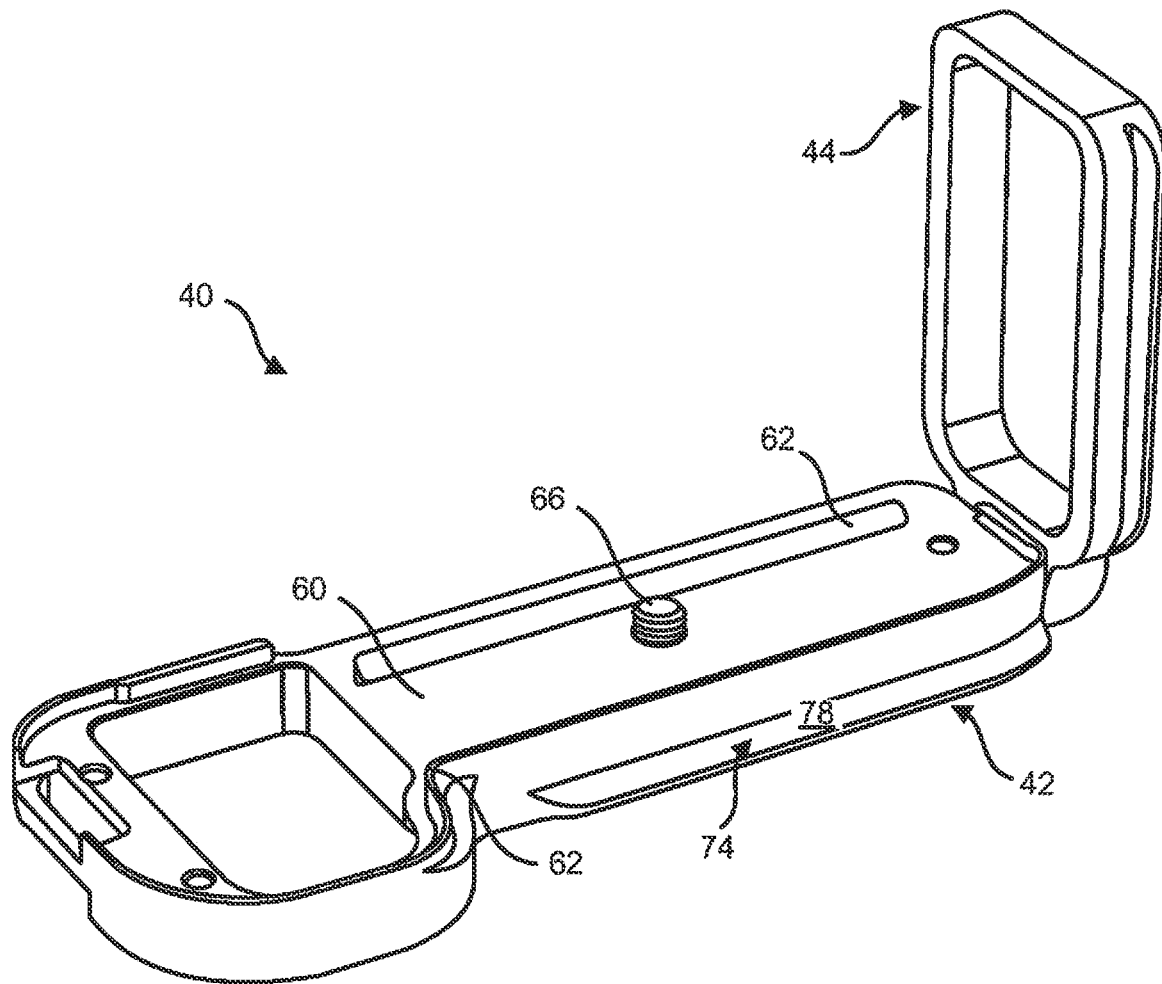
FIG. 3 illustrates a pictorial view of the L-plate.
Figure 4:
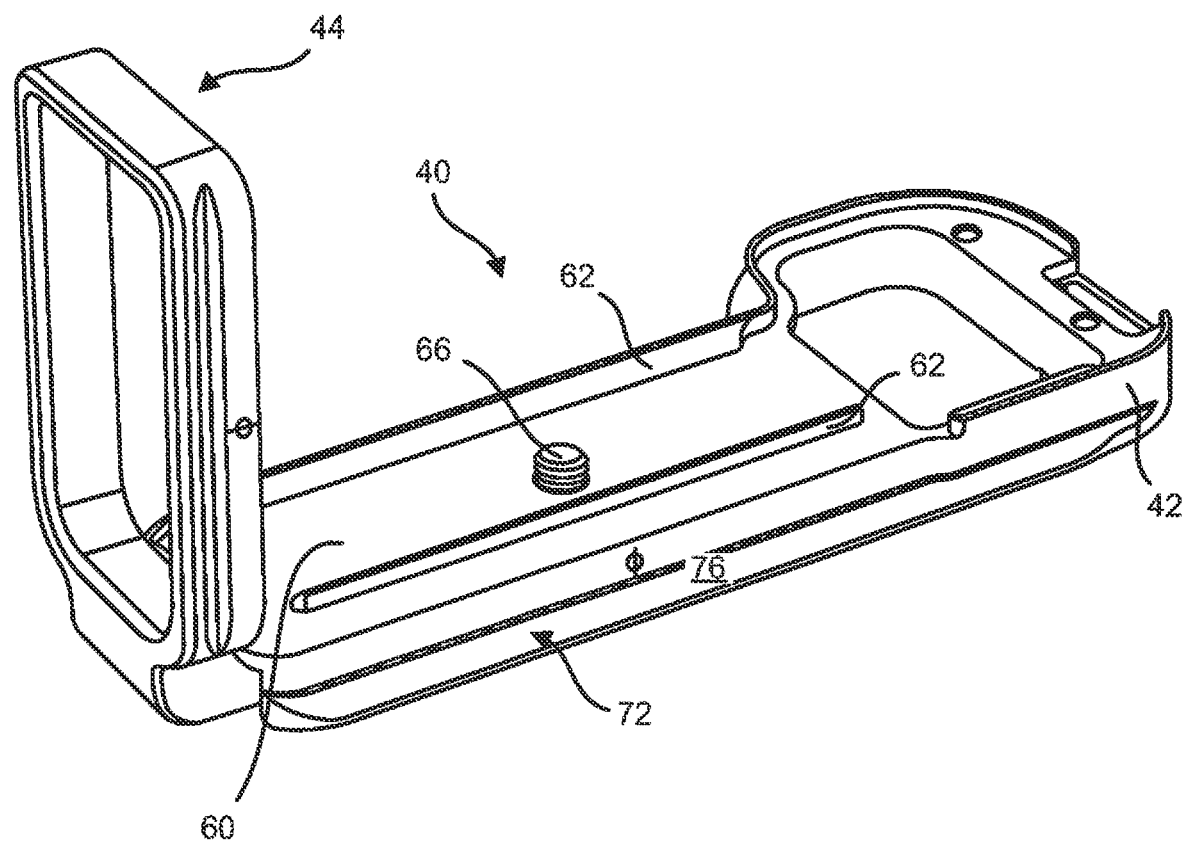
FIG. 4 illustrates a pictorial view of the L-plate.

FIG. 1 illustrates a photographic equipment mounting assembly 40, commonly referred to as an L-plate or L-bracket, comprising a base member or plate 42 and a side member or plate 44 projecting substantially normal to the base plate to wrap around and extend parallel to the side of the camera's body 48. Referring also to FIGS. 2, 3, and 4 the base plate 42 of the extendible L-plate 40 preferably has an upper camera body interface portion 60 adapted to receive and restrain the lower surface 46 of the body 48 of a camera. At least one of the edges 62 of the upper portion 60 of the base plate preferably projects upward from the longitudinal center 64 of the upper portion to define a shallow receptacle shaped for close fitting engagement with the lower surface of the camera's body. This receptacle restrains the camera against twisting about an axis normal to the surface of the upper portion without the need for an intervening layer of friction material which could enhance vibrational freedom of the camera. The interface portion of the base plate also includes a feature enabling the base plate to be secured to the body of the camera. While other securing features such as a latch might be used to secure a camera to a base plate, cameras commonly include a threaded aperture in the lower portion of the body which is engageable by a screw 66 that projects upward through the upper surface of the base plate 42. Preferably, the screw is secured in the base plate. For example, the screw may include a shank with an unthreaded portion proximate the screw's head which permits the screw to rotate in a tapped hole in the base plate without backing out.

Figure 5:
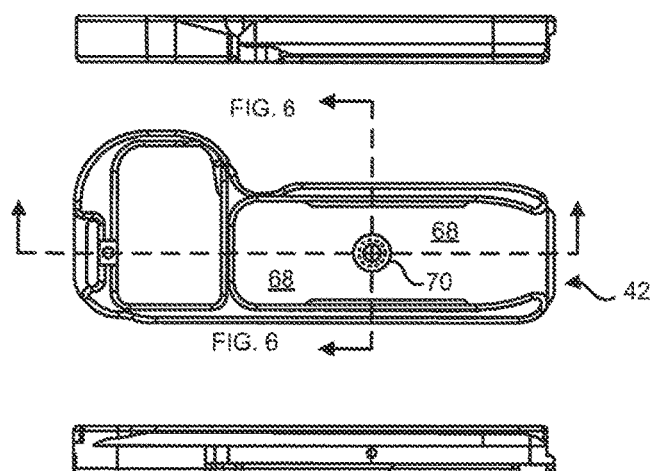
FIG. 5 illustrates a bottom view and side view of the L-plate.
Figure 6:
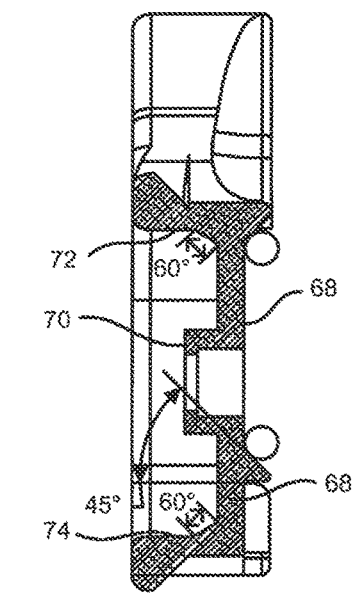
FIG. 6 illustrates a cut away view of the L-plate.

Referring also to FIGS. 5 and 6, the lower portion of the base plate 42 includes an L-plate retention feature comprising a first central raised portion 68 having depressed central portion 70 and a general shape, in a plan view, of the letter U. Opposing peripheral surfaces of the legs 72, 74 each comprise a surface portion 76, 78 sloping (e.g., arranged at a forty-five degree angle) so that the cross-section has the shape and dimension of a dovetail tenon and, preferably, the tenon portion of an Arca-Swizz quick-release system. Camera equipment may be attached to a ballhead 24 or other attaching device in the landscape orientation by engaging the base plate 42 of the L-plate 40 with a receiver 36 of a quick-release system, for example, a clamp of the Arca-Swizz quick-release system, which is attached to the stem 34 of the ballhead. To secure the base plate 42 in the receiver 36, the Arca-Swizz receiver typically comprises a lever 45 or screw operated clamping body 43 with sloping opposed jaw surfaces arranged to engage and clamp the sloping surfaces 76, 78 of the base plate 42.

Figure 9:
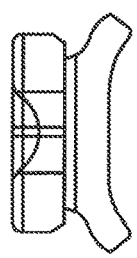
FIG. 9 illustrates a top view of an upward leg of the L-plate.
Figure 9:
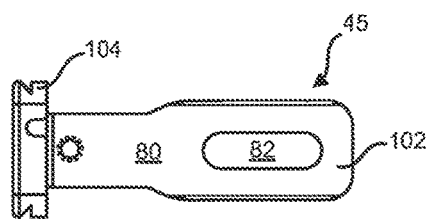
Figure 9:
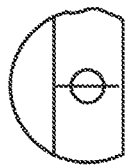
Figure 8:
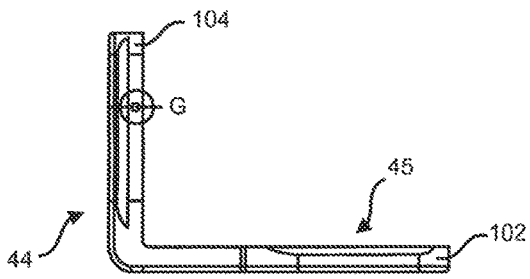
FIG. 8 illustrates a is a side view of an upward leg of the L-plate.
Figure 7:
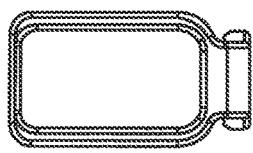
FIG. 7 illustrates a bottom view of an upward leg of the L-plate.
Figure 7:
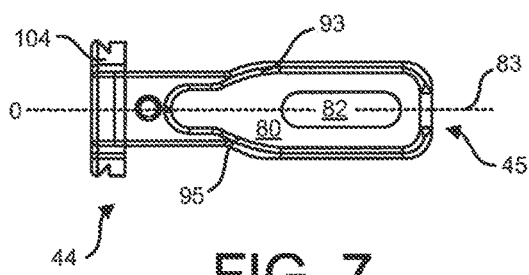
Figure 7:
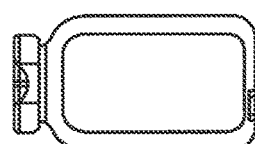

Referring also to FIGS. 7, 8, and 9 a side plate 44 includes an engagement portion 45. A second central raised portion 80, projects outward at the longitudinal center of the depressed central portion 70 of the first raised portion 68. The second central raised portion 80 includes a pair of legs 93 and 95. The second central raised portion 80 is discontinuous comprising an opening 82 enabling location of the camera securing element, the screw 66, at the center 83 of the base plate.

Figure 10:
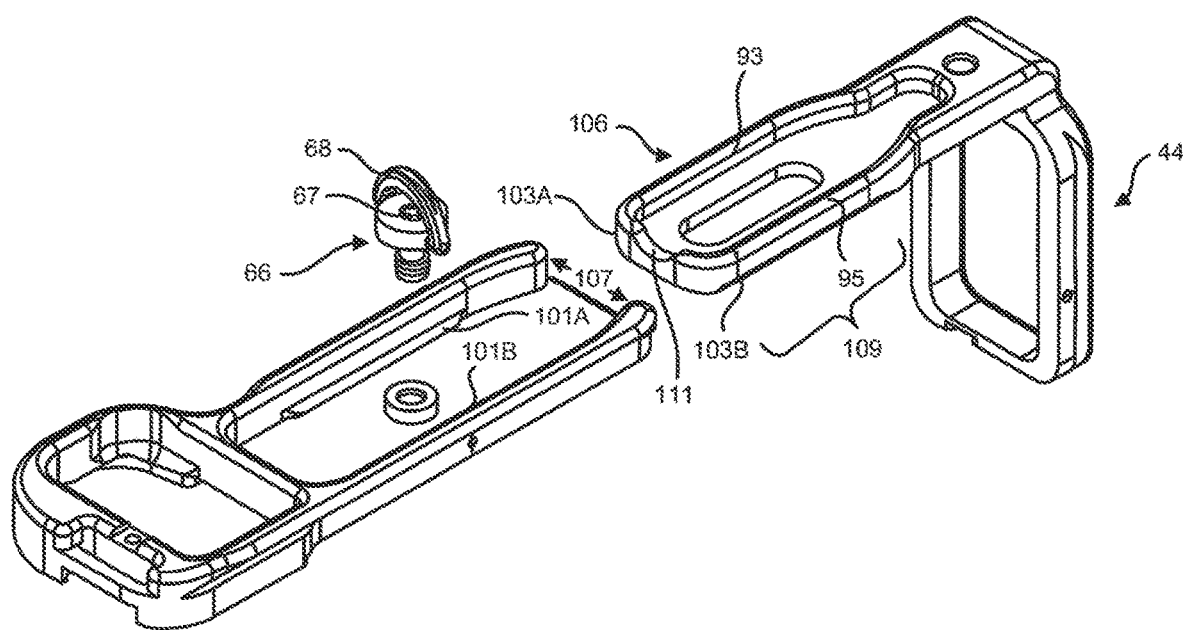
FIG. 10 illustrates a perspective view of the bottom of the L-plate in two parts.
Figure 13:
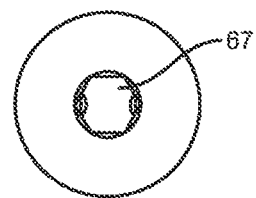
FIG. 13 illustrates a top view of a screw.
Figure 11:
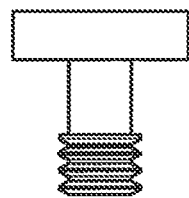
FIG. 11 illustrates a side view of a screw.
Figure 12:
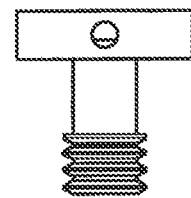
FIG. 12 illustrates a side view of a screw and opening.
Figure 14:
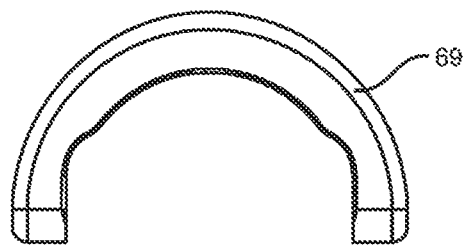
FIG. 14 illustrates a front view of a handle.
Figure 15:
FIG. 15 illustrates a side view of a handle.

The side plate 44 of the L-plate 40 includes a lower leg 102 and an upper leg 104 that projects substantially normal to the lower leg. Referring also to FIG. 10, in an elevation view, the lower leg 102 of the exemplary side plate has the general shape of a rectangular tube section defining a central aperture. The generally parallel vertical legs 93, 95 of the lower leg 102 have generally rectangular cross-sections with opposing peripheral surfaces. The lower leg 102 comprises second L-plate mating feature securable by engagement with the base plate 42. In particular, the base plate 42 and the lower leg 106 include matching sloping surfaces 101A, 1016, and 103A, 103B. The sloping matching services inhibit rocking movement of the lower leg 106 with respect to the base plate 42. The lower leg 102 of the side plate 44 has a generally rectangular cross-section preferably having a dimension approximating the width of the depressed central portion 70 of the base plate 42. The upper surface 80 of the lower leg 102 includes the opening 82 extending a substantial portion of the length of the first central raised portion 68 of the base plate 42.

Referring to FIGS. 11, 12, 13, 14, and 15, the screw 66 includes a socket head cap screw 67 for securing with a tool. In addition, the screw 66 includes a foldable thumb screw 69.

Figure 16:
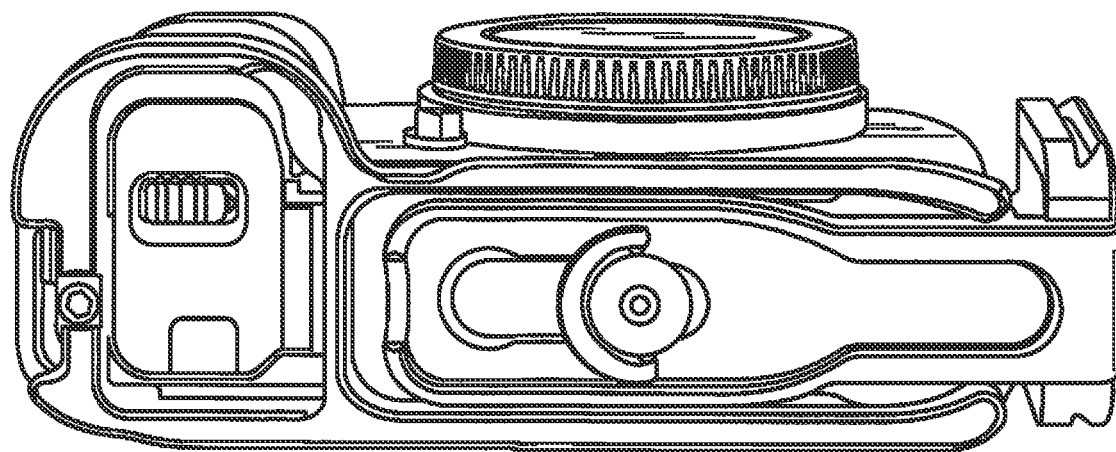
FIG. 16 illustrates a bottom view of a camera with the L-plate attached thereto in a retracted position.
Figure 17:
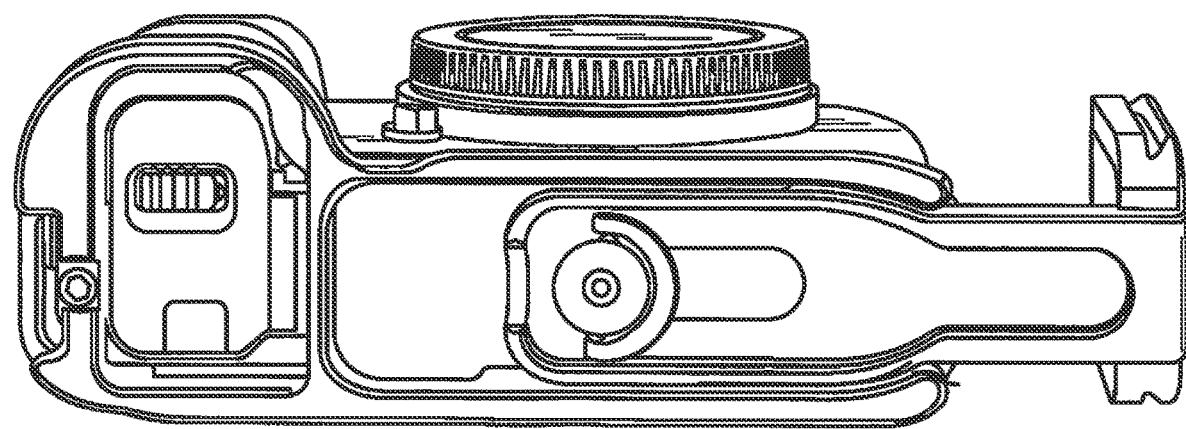
FIG. 17 illustrates a bottom view of the camera with the L-plate attached thereto in an extended position.

By loosening and tightening the screw 66, the location of the side plate 44 relative to the camera can be modified. In addition, the legs 72, 74 define a restricted region 107 that prevents the side plate 44, and in particular an expanded region 109, from extending past a predefined distance. Also, a recessed portion 111 is suitable to receive the foldable thumb screw 69. FIGS. 16 and 17 illustrate the sliding of the side plate 44 relative to the base plate 42. Also, the legs 72, 74 have adjacent inner chamfer (e.g., 60 degree) that assist with aligning and squaring up the L-component to the base component when the thumb screw is engaged.

Referring also to FIG. 1, the camera equipment 20 can be attached to a tripod 22, monopod, or other support in the landscape orientation, e.g., the bottom surface 46 of the camera's body 48 substantially horizontal, by engaging the dovetail tenon of the base plate 42 with the cooperating dovetail clamping surfaces of a clamp portion 43 of a quick-release receiver 36 affixed to the support. To switch the camera to the portrait orientation, e.g., with the bottom surface 46 of the camera substantially vertical, the user releases the clamp of the quick-release receiver and disengages the dovetail tenon of the base plate from the receiver. If the camera is not attached to a remote device by cabling that would interfere with the receiver, the camera equipment 20 can be rotated to the portrait orientation and the dovetail surfaces of the side plate 44 inserted into the clamping body 43 of the receiver 36 and secured.

However, it may be desirable to connect the camera to one or more remotely located accessories, such as a microphone, shutter control switch or a flash unit. In addition, digital cameras are commonly connected to remote devices, such as, a computer, printer or video monitor to enable transferring and viewing images and video captured with the camera. To enable communication with remote devices and accessories, a digital camera commonly includes portions of one or more cable connectors, such as an Ethernet connector or an N-type connector, located behind one or more doors in the side of the camera's body. Plural cable assemblies connect the exemplary camera equipment to one or more remote devices or accessories (not shown). Each cable assembly includes an appropriate connector portion, such as, a universal serial bus (USB) connector, a high-definition multi-media interface (HDMI) connector, an N-type connector or other connector utilized in communicating with the specific remote device or accessory. Connectors and cables of some cable assemblies extend distal of the engaging face of the side plate and would interfere with the receiver if the camera was turned to the portrait orientation.

Figure 18:
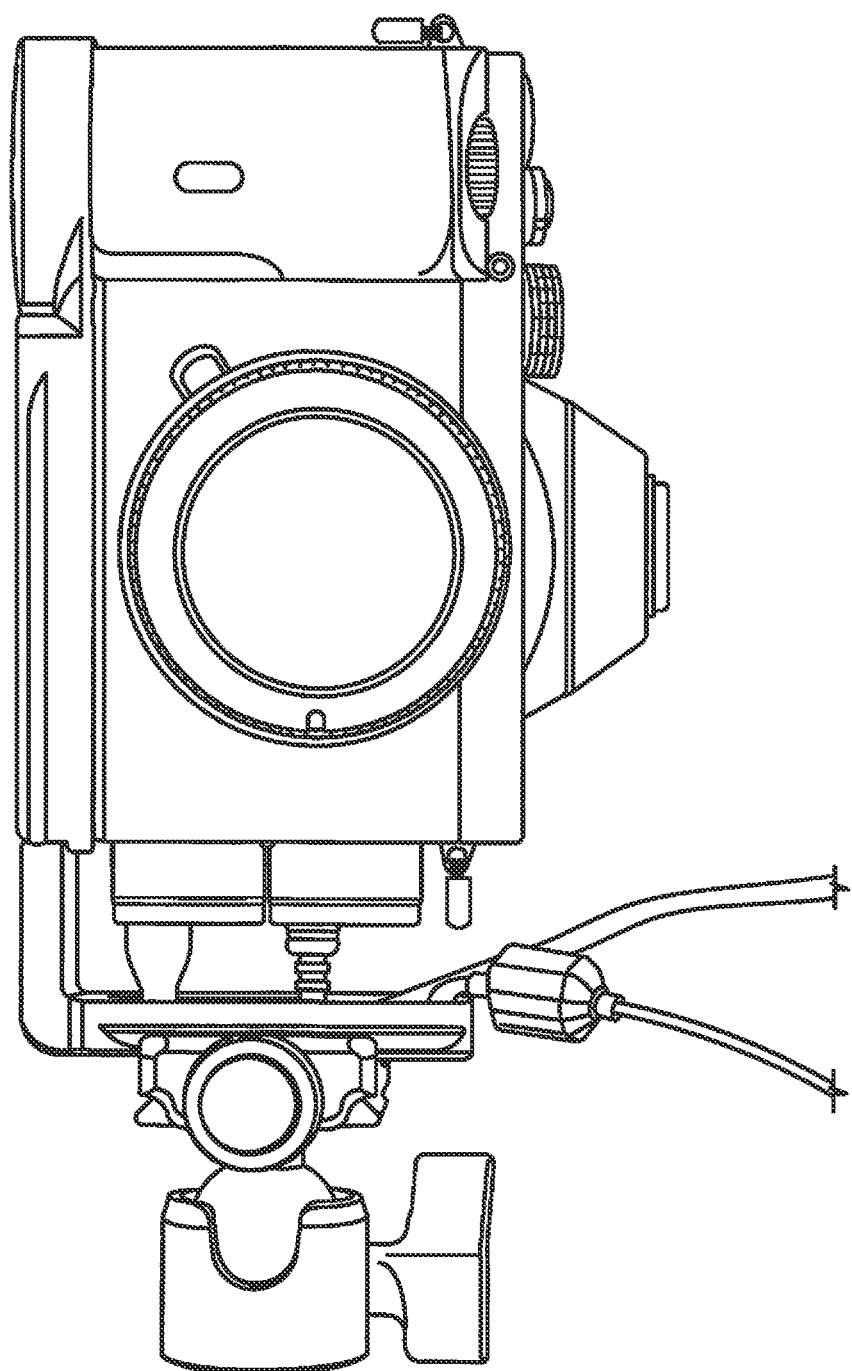
FIG. 18 illustrates a front view of the camera with L-plate attached thereto in an extended position.

Referring to FIGS. 16, 17, and 18, to extend the L-plate 40, the user loosens the screw and the base plate and the side plate are slid away from each other while remaining connected by the screw 66. By extending the L-plate, clearance can be provided between the camera's body 48 and the side plate 44 providing clearance for cable assemblies projecting from the side of the camera body.

The two-piece extendable L-plate provides clearance between a camera body and the apparatus securing the camera to a support for cables connected to the side of the camera permitting the camera to be supported on a tripod or other support in either landscape or portrait orientation without the use of a separate spacer element.

Figure 19:
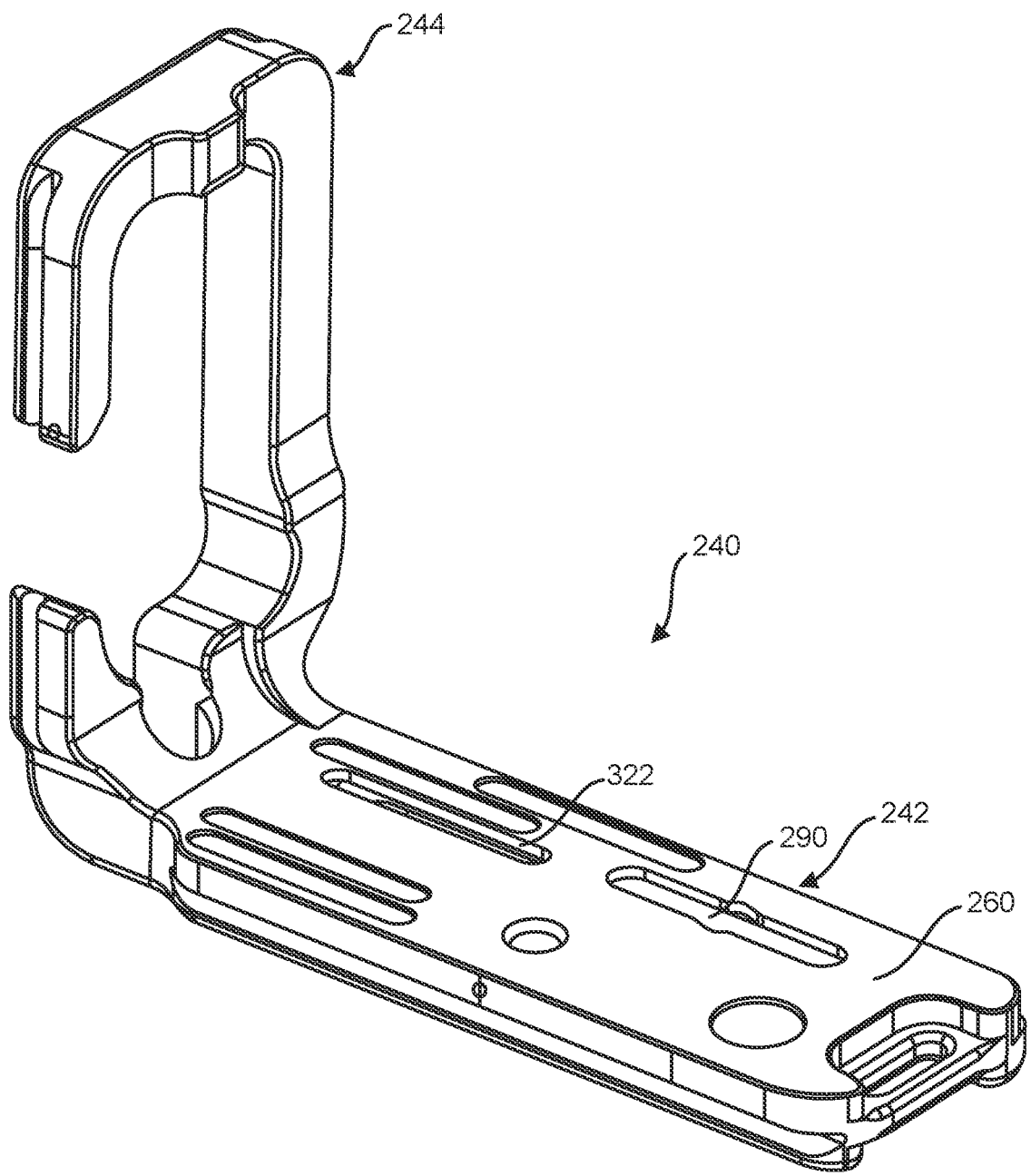
FIG. 19 illustrates a pictorial view of a base plate and a side plate for a modified L-plate.

Referring to FIG. 19, a modified photographic equipment mounting assembly 240, commonly referred to as an L-plate or L-bracket, may include a base member or plate 242 and a side member or plate 244 projecting substantially normal to the base plate to wrap around and extend parallel to the side of the camera's body 48. The base plate 242 and the side plate 244 may be secured together such that they are not readily movable with respect to one another, formed from a single piece of material, or otherwise may be movable and/or detachable from one another. The base plate 242 of the L-bracket 240 preferably has an upper camera body interface portion 260 adapted to receive and restrain the lower surface 46 of the body of the camera 48. Preferably, the upper camera body interface portion 260 is planar over a majority of its surface and does not include edges that project upwardly from the horizontal center of the upper portion. The interface portion of the base plate also includes a feature enabling the base plate to be secured to the body of the camera. While other securing features, such as a latch may be used to secure a camera to a base plate, cameras commonly include a threaded aperture in the lower portion of the body which is engageable by a screw 280 (see FIG. 29) that projects upward through the upper surface of the base plate 242. Preferably, the screw 280 is secured in the base plate. For example, the screw may include a shank with an unthreaded portion proximate the screw's head which permits the screw to rotate in a tapped hole in the base plate without backing out.

In many cases, it is desirable that the base plate 242 is repositionable on the base of the camera, so that the side plate 244 may be adjusted to modify its distance from the side of the camera 48. For example, in some situations it is desirable for the side plate 244 to be in close proximity to the side of the camera 48. For example, in some situations it is desirable for the side plate 244 to be further distant from the side of the camera 48. While permitting the side plate 244 to be adjustable with respect to the side of the camera 48, it is also desirable that the camera 48 is effectively restrained against twisting about an axis normal to the surface of the upper camera body interface portion 260 to enhance vibrational freedom of the camera.

Figure 20:
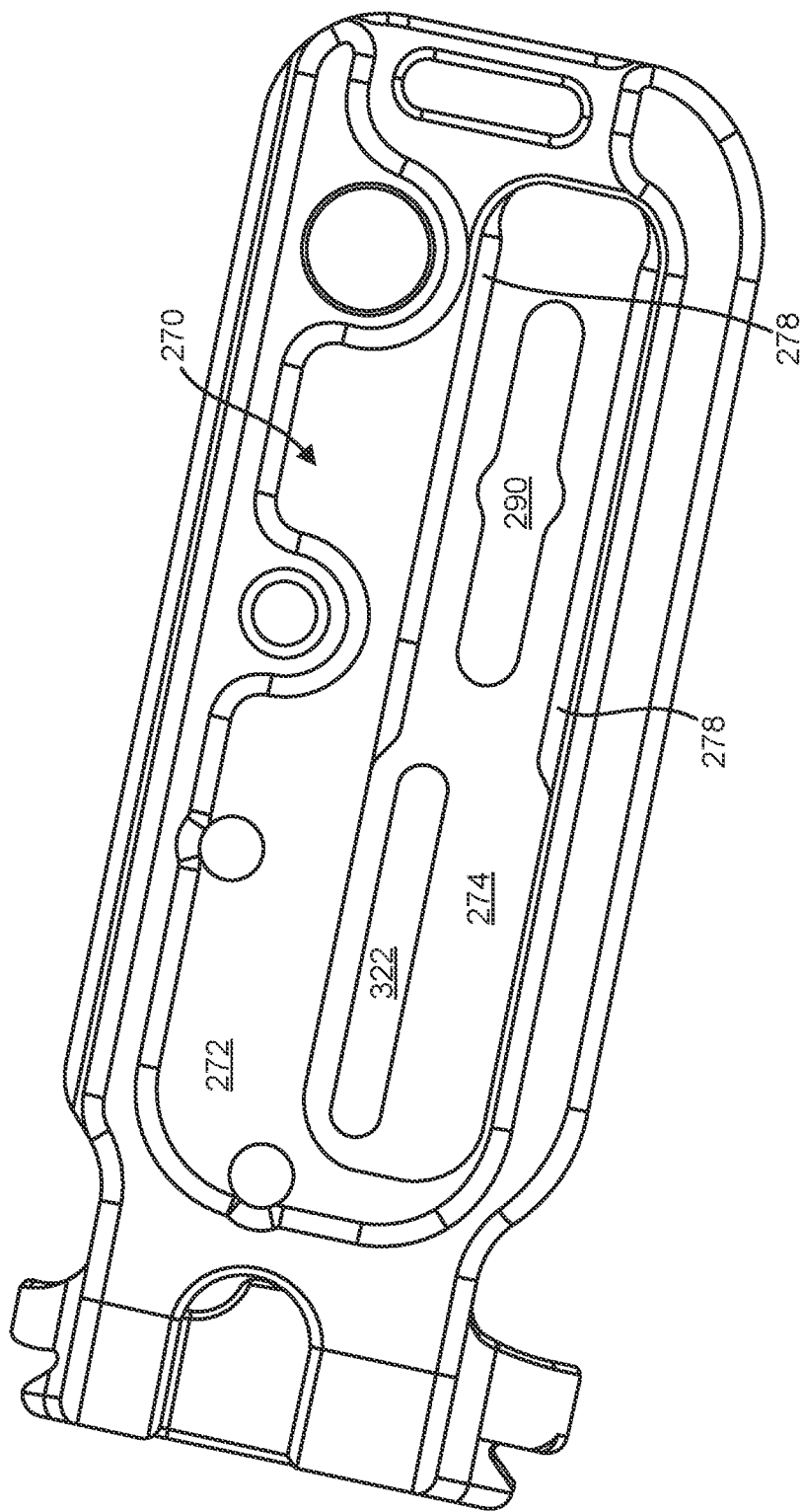
FIG. 20 illustrates a bottom view of the base plate and side plate for the modified L-plate.
Figure 21:
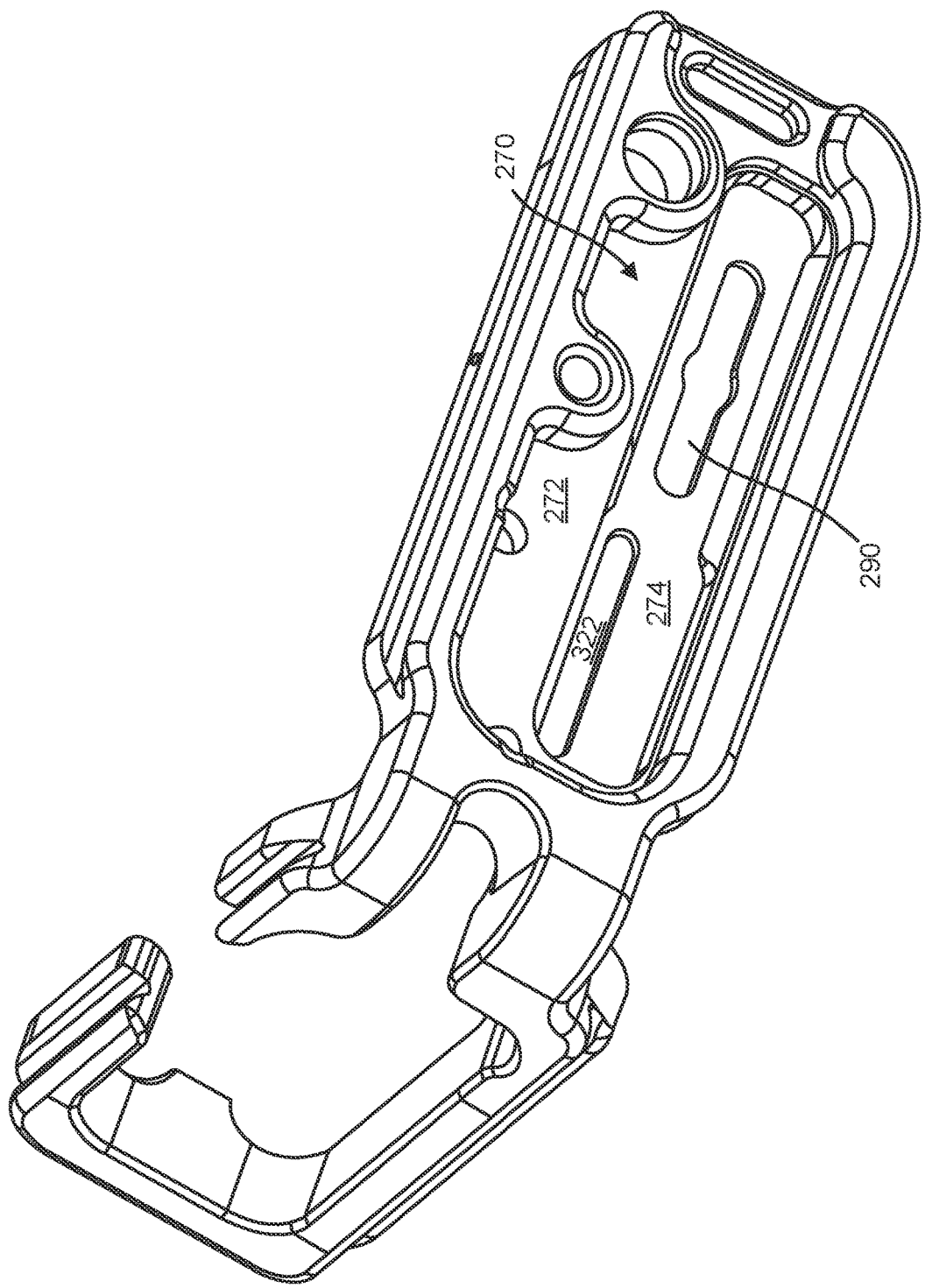
FIG. 21 illustrates a bottom pictorial view of the base plate and side plate for the modified L-plate.
Figure 22:
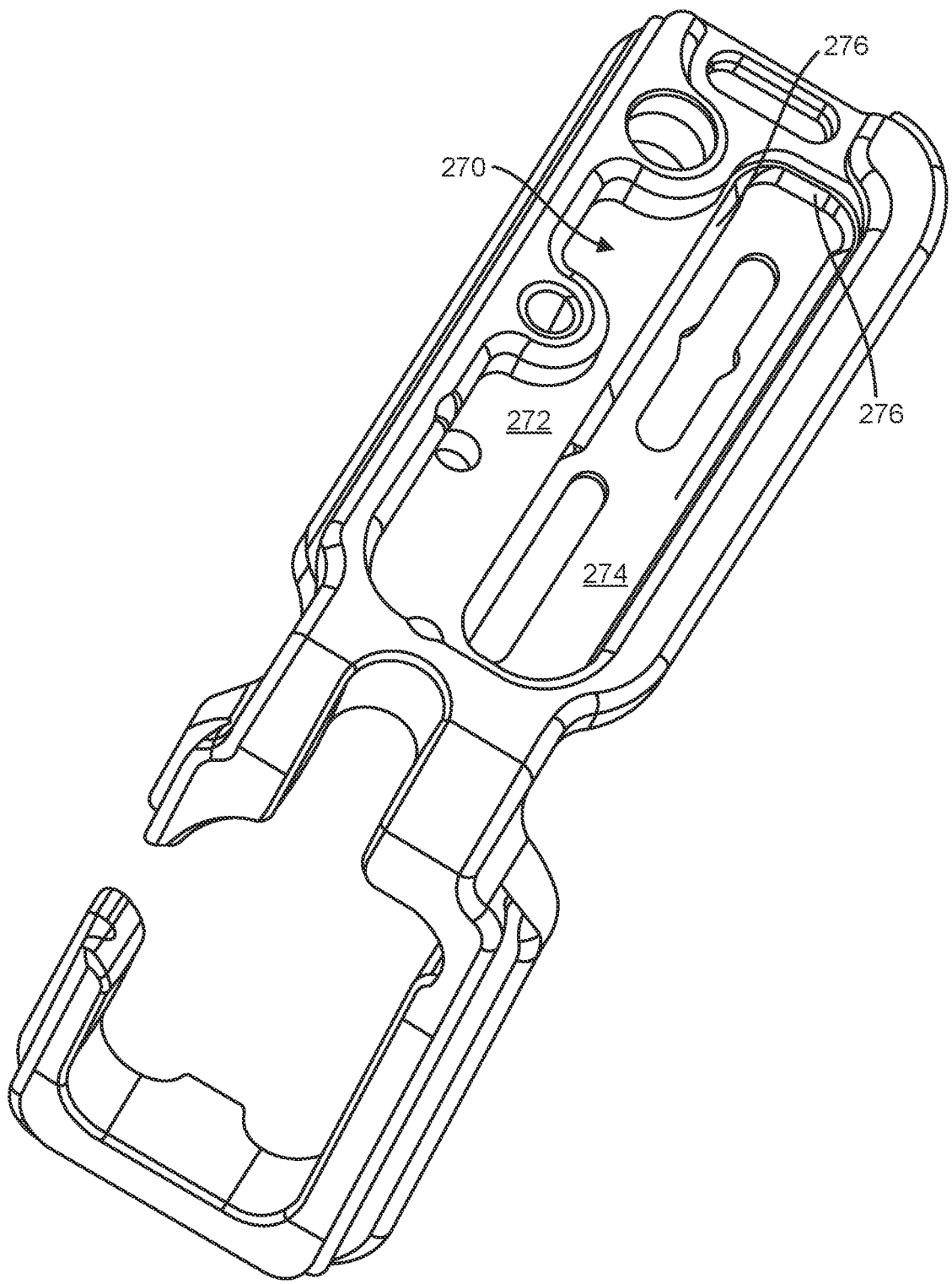
FIG. 22 illustrates a bottom pictorial view of the base plate and side plate for the modified L-plate.

Referring to FIG. 20, FIG. 21, and FIG. 22, the lower portion of the base plate 242 may include a depressed central portion 270. The depressed central region 270 may include at least two different regions, namely, a first depressed region 272 having a first depression depth, and a second depressed region 274 having a second depression depth greater than the first depression depth. The second depressed region 274 includes a sidewall 276 around it.

Figure 23:
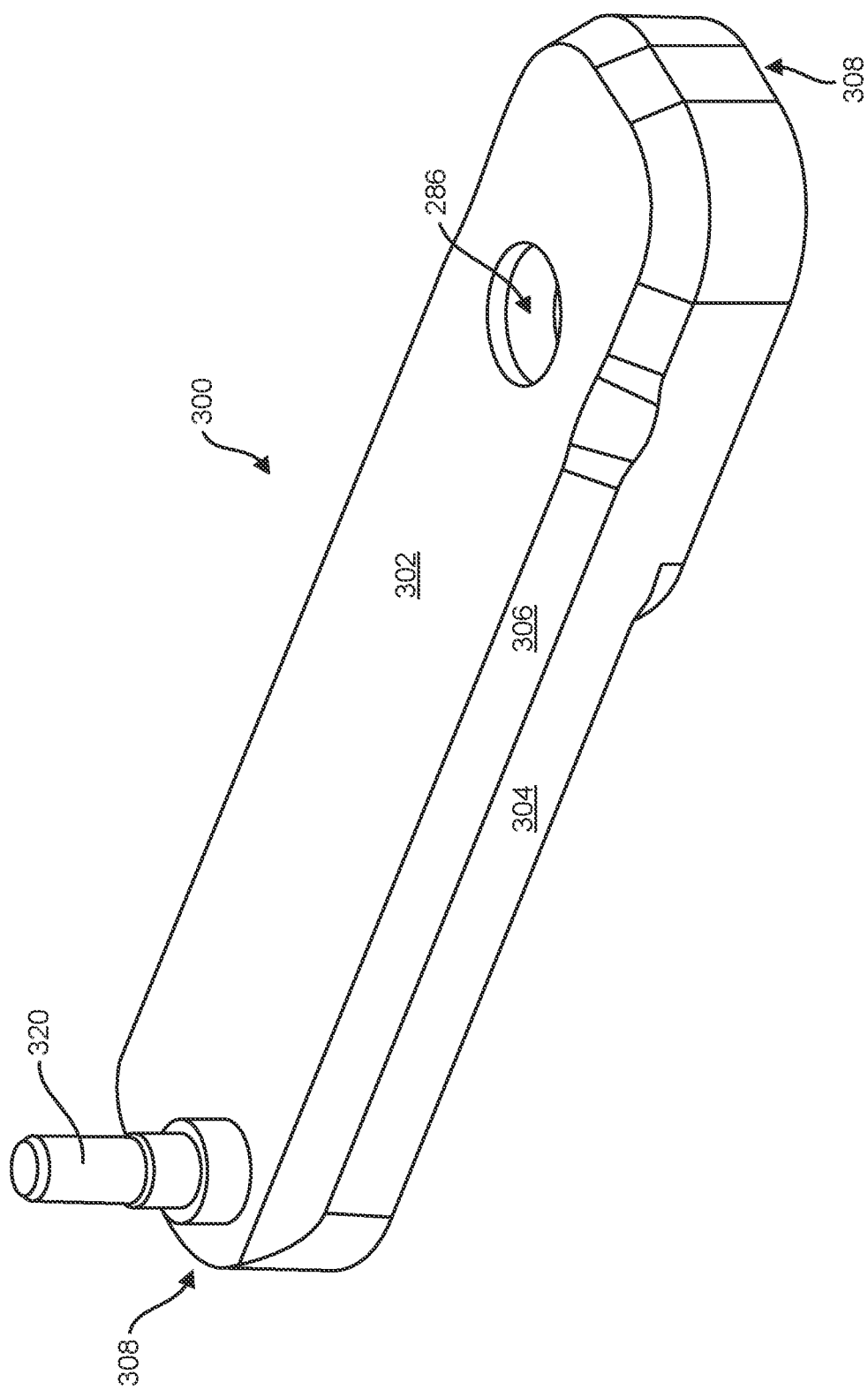
FIG. 23 illustrates a pictorial view of a shuttle of the modified L-plate.
Figure 24:
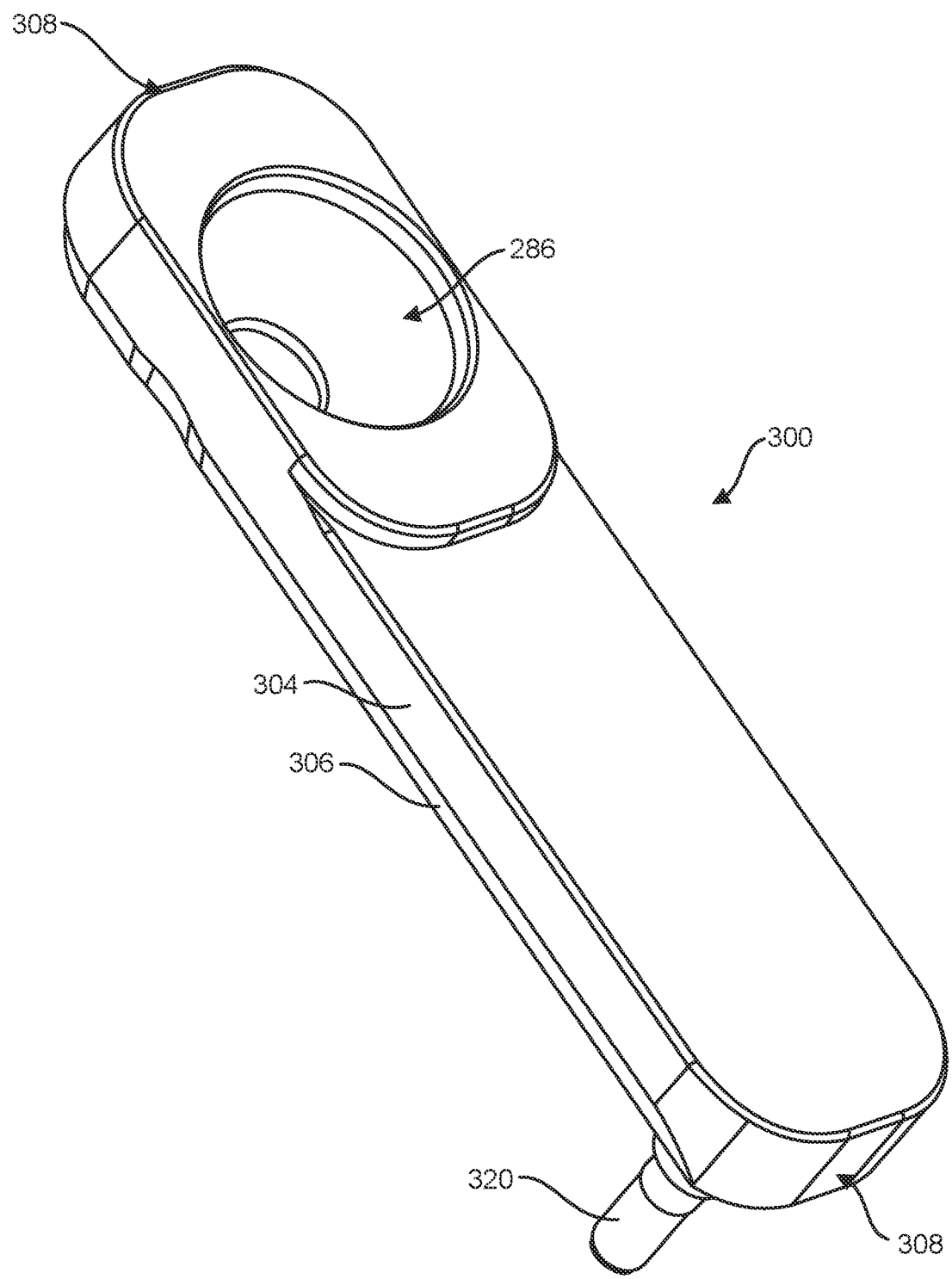
FIG. 24 illustrates a bottom pictorial view of the shuttle of the modified L-plate.
Figure 25:
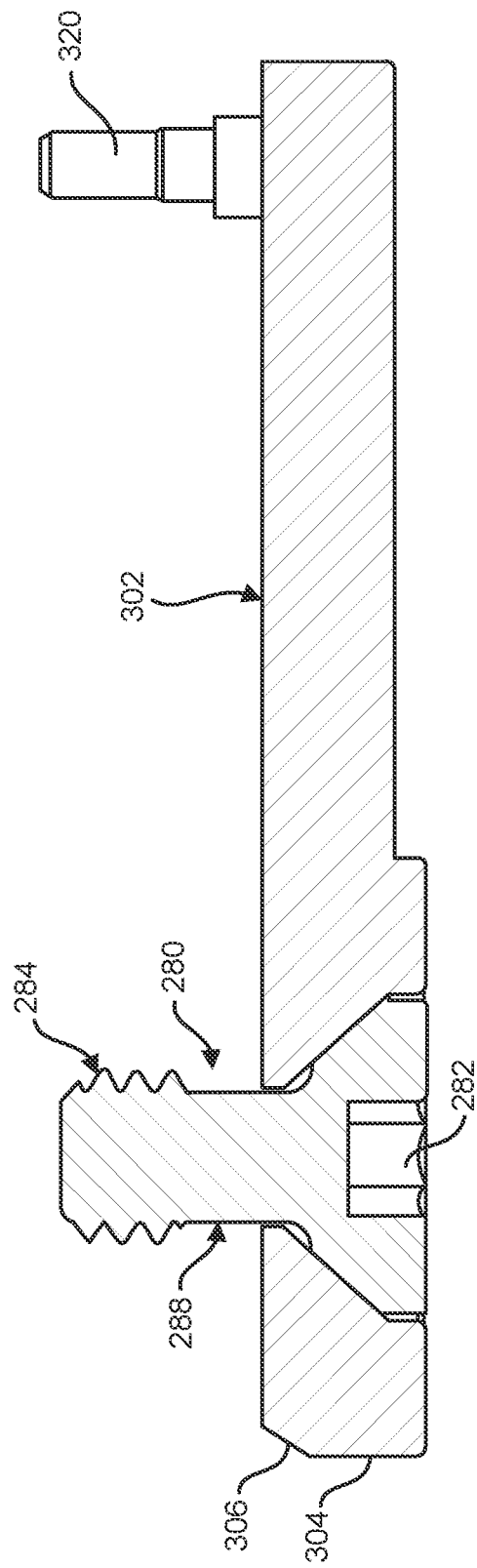
FIG. 25 illustrates a side cutaway view of the shuttle of the modified L-plate.
Figure 26:
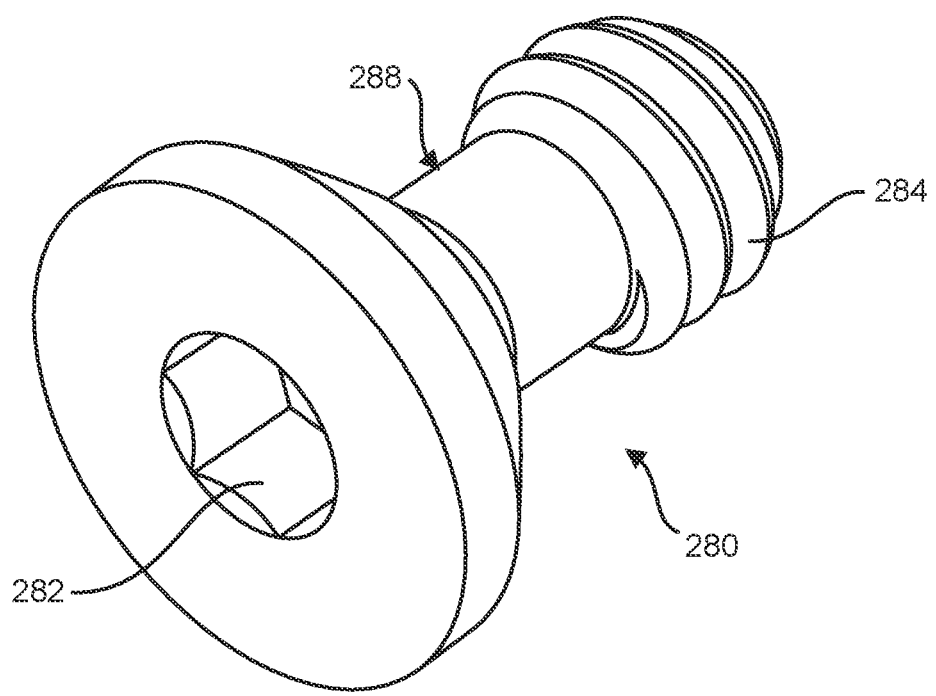
FIG. 26 illustrates a screw for the modified L-plate.

Referring to FIG. 23, FIG. 24, and FIG. 25, a shuttle 300 includes a planar upper surface 302 and a planar side surface 304 with an inclined surface 306 therebetween. The shuttle 300 preferably includes an elongate shape with curved ends 308 thereof. The shape of the shuttle 300, and inclined surfaces 306 thereof, are shaped to matingly engage the shape of the second depressed region 274 inclusive of inclined surfaces 278 thereof. Referring also to FIG. 26, the screw 280 defines a hexagonal opening 282 on one end and threads 284 on the other end may be engaged with an opening 286 defined by the shuttle 300. The screw 280 may be held captive in the shuttle 300 by the threaded portion 284 threading through the opening 286 and being retained from non-threaded removal by the difference in the diameter of the shaft 288 of the screw 280 and the diameter of the threaded portion 284.

Figure 27:
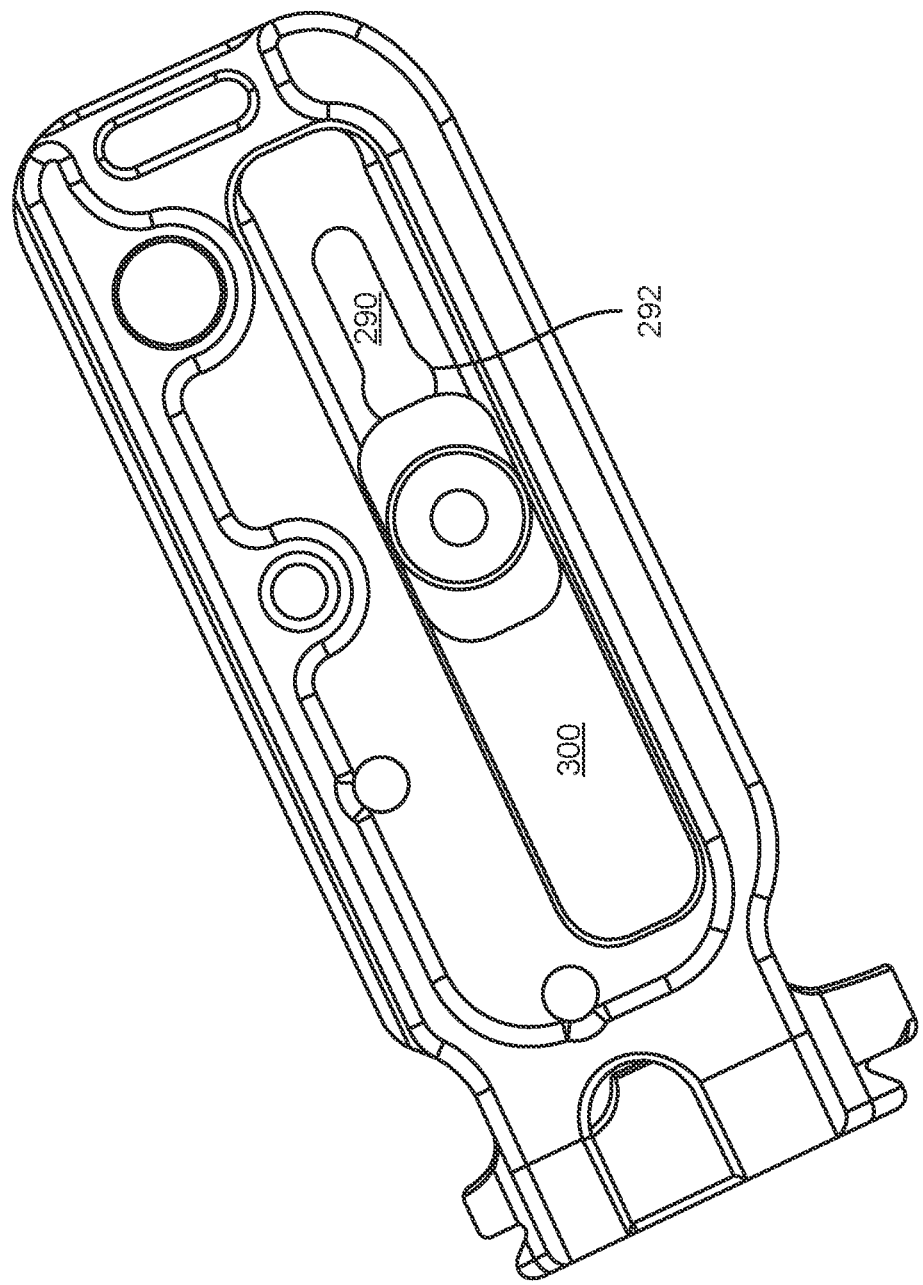
FIG. 27 illustrates a bottom view of the shuttle and base member for the modified L-plate.
Figure 28:
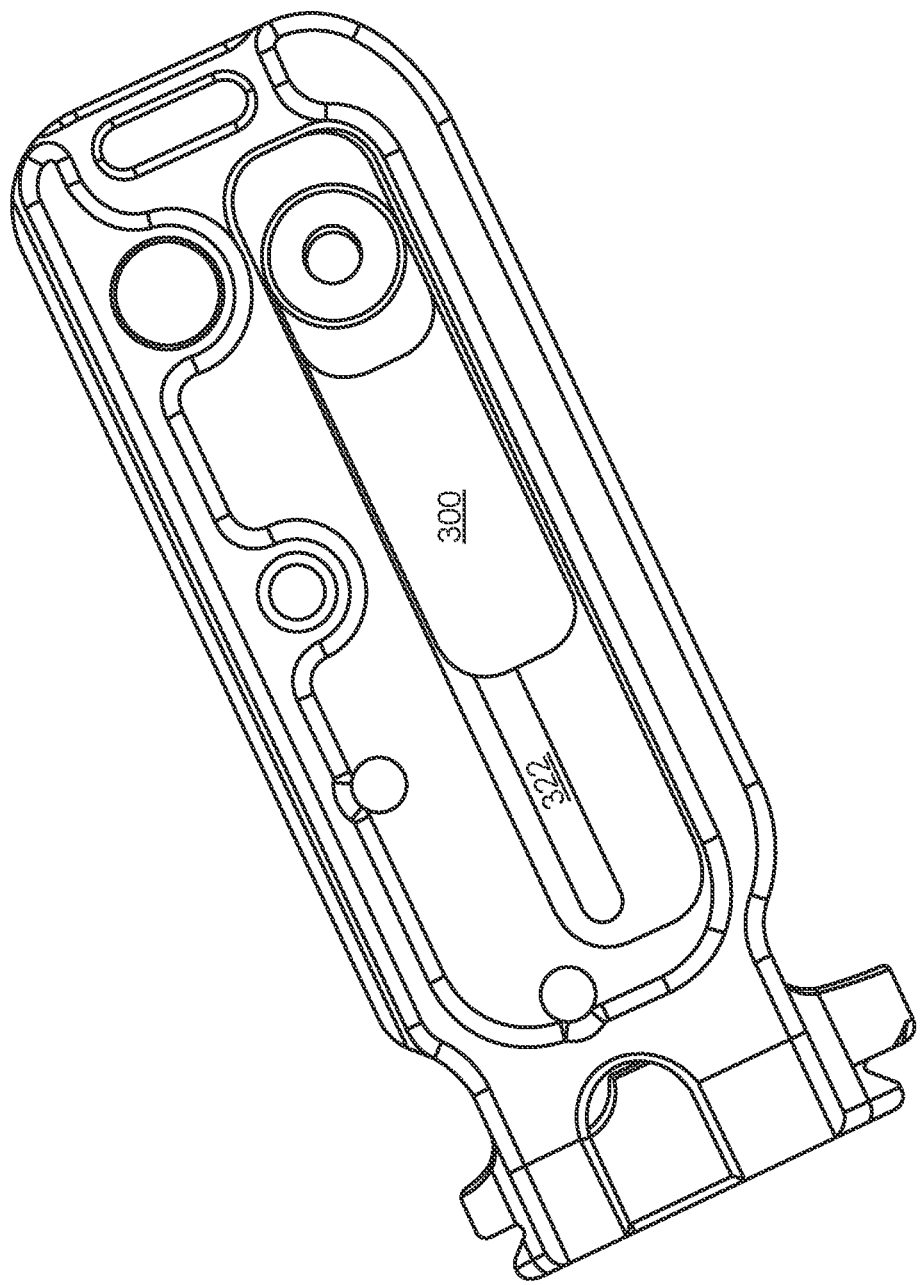
FIG. 28 illustrates a bottom view of the shuttle and base member for the modified L-plate.

Referring to FIG. 27 and FIG. 28, the shuttle 300 may be engaged with the second depressed region 274. The shuttle 300 is sized such that it may slide along a single axis within the second depressed region 274. When the shuttle 300 is engaged with the second depressed region 274, the opening 286 defined by the shuttle 300 is aligned with an elongate slot 290 defined by the base plate 242. The screw 280 is sized such that the threaded portion 284 may pass through a widened portion 292 by rotation of the threaded portion 284 with the widened portion 292 of the elongate slot 290. In this manner, the screw 280 may be held captive in the base plate 242 by the threaded portion 284 threading through the widened portion 292 and being retained from non-threaded removal by the difference in the diameter of the shaft 288 of the screw 280 and the diameter of the threaded portion 284.

Figure 29:
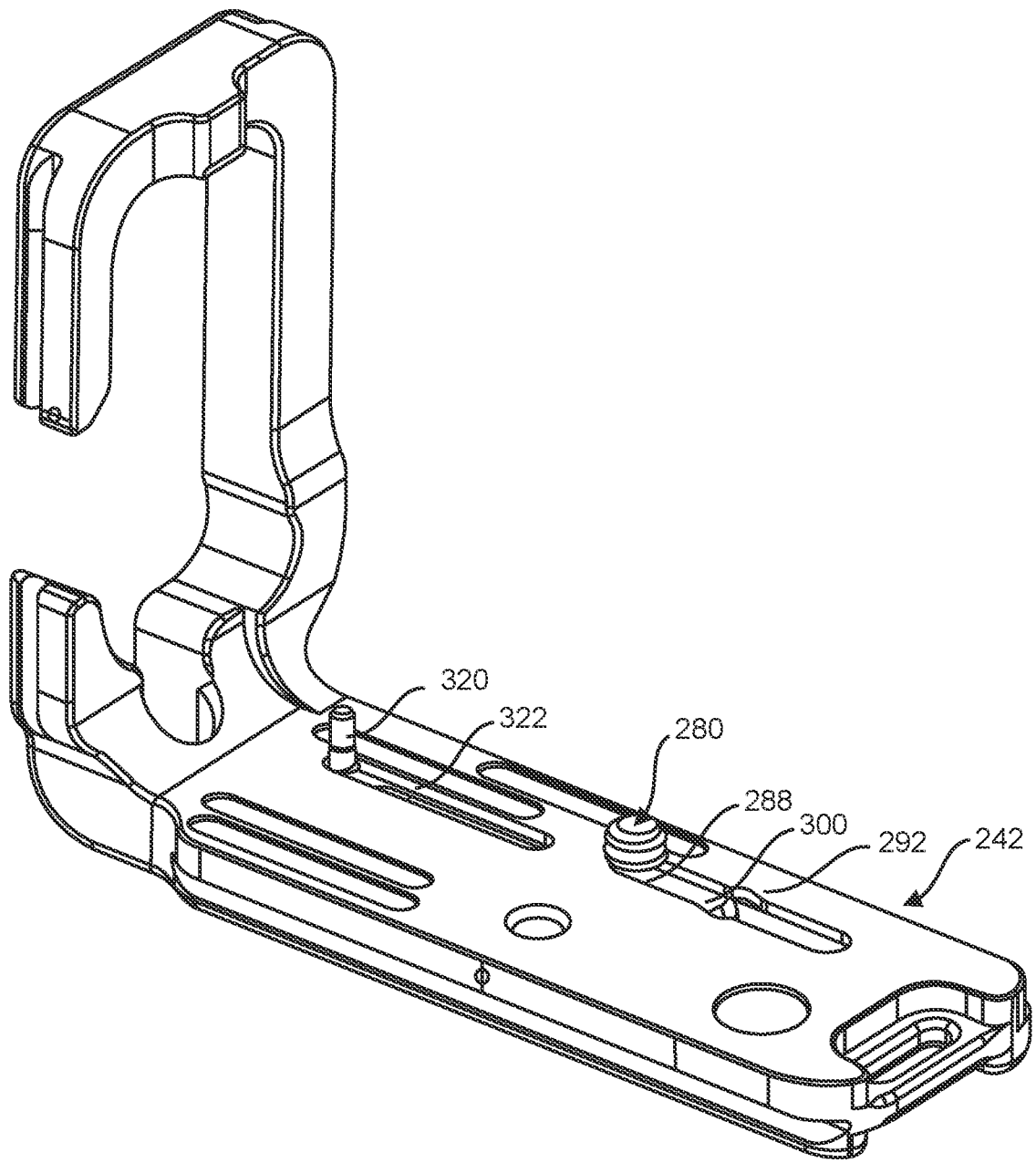
FIG. 29 illustrates a pictorial view of a base plate and a side plate together with the shuttle for the modified L-plate.
Figure 30:
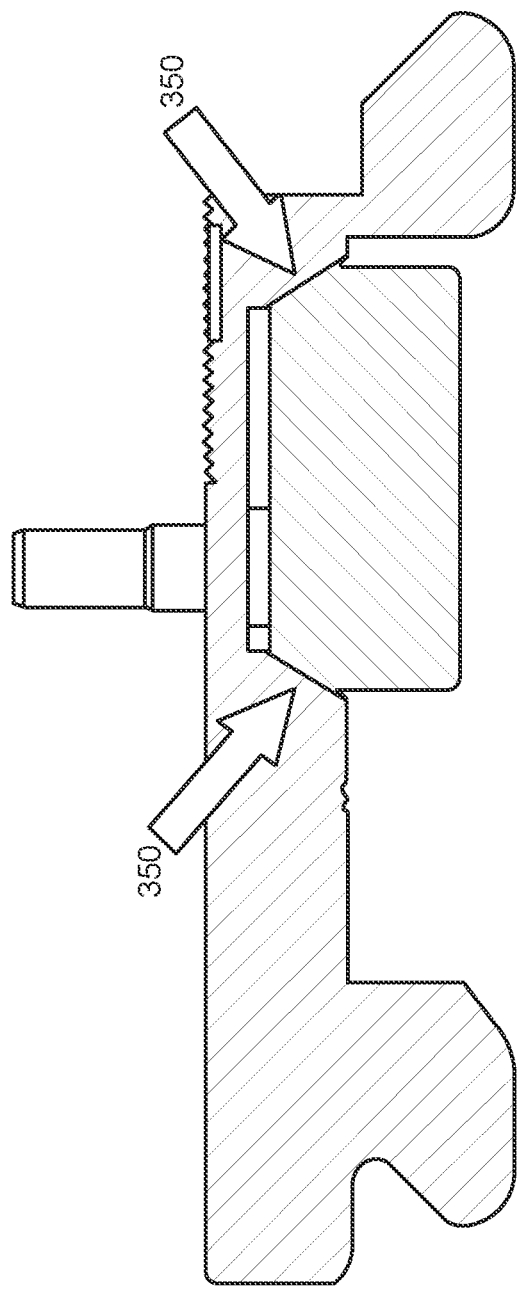
FIG. 30 illustrates an end cutaway view of the shuttle and base plate for the modified L-plate.
Figure 31:
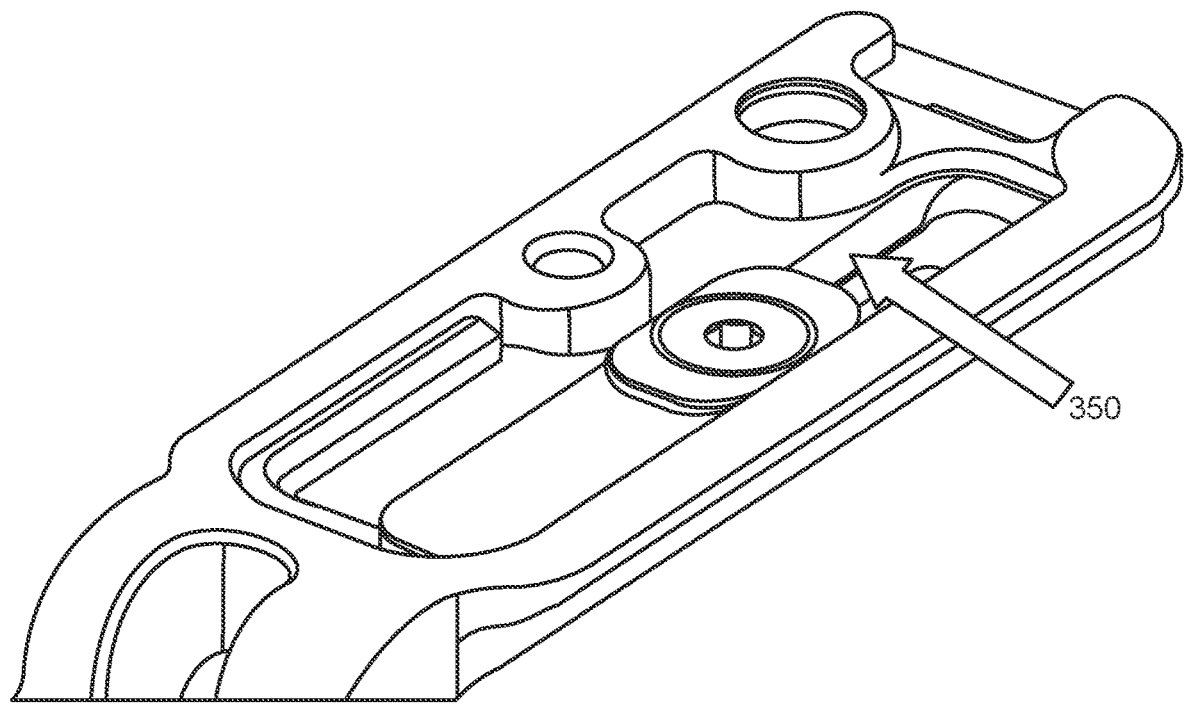
FIG. 31 illustrates a bottom view of the base plate and shuttle for the modified L-plate.

Referring to FIG. 29, the shuttle 300 and the base plate 242 are engaged with one another by the screw 280, with the diameter of the shaft 288 of the screw 280 being sized to slide along the elongate slot 290. The shuttle 300 also includes a locating pin 320 that is aligned with a locating slot 322 defined by the base plate 242. As it may be observed, the screw 280 is slidably engaged along a single axis by the elongate slot 290, and the locating pin 320 is slidably engaged along a single axis by the locating slot 322, where both axes are either co-linearly positioned or parallel with one another. The camera 48 may include a threaded opening on the base thereof that is engaged with the screw 280, while the camera 48 further includes a depression or hole or other structure therein that is engaged with the locating pin 320. In this manner, the camera 48 is retained from rotation by both the screw 280 and the locating pin 320. Referring to FIG. 30 and FIG. 31, the inclined surfaces 350 of the base plate 242 and the shuttle 300 further inhibit twisting of the camera 48.

Figure 32:
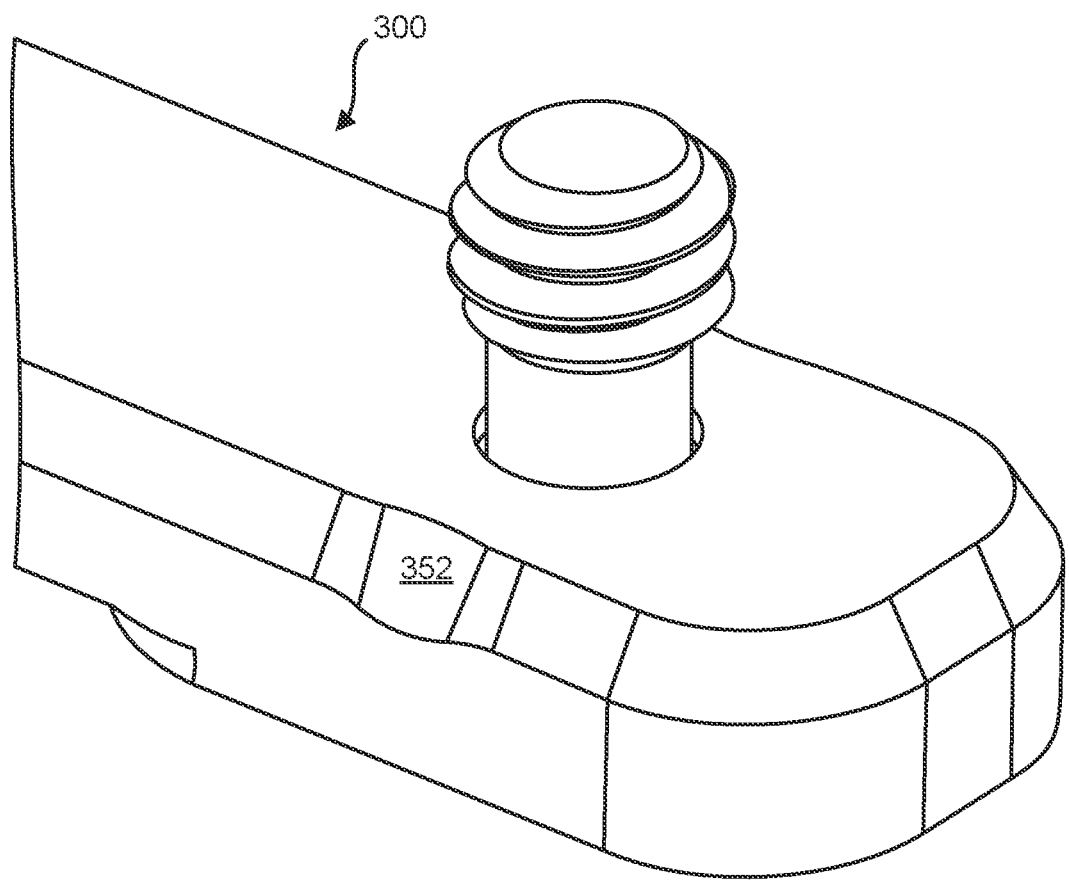
FIG. 32 illustrates an enlarged view of the shuttle and screw for the modified L-plate.

Referring to FIG. 32, the shuttle 300 includes a tapered edge that includes an interrupted portion 352 under the screw head to allow for a more even screw mounting pressure.

Figure 33:
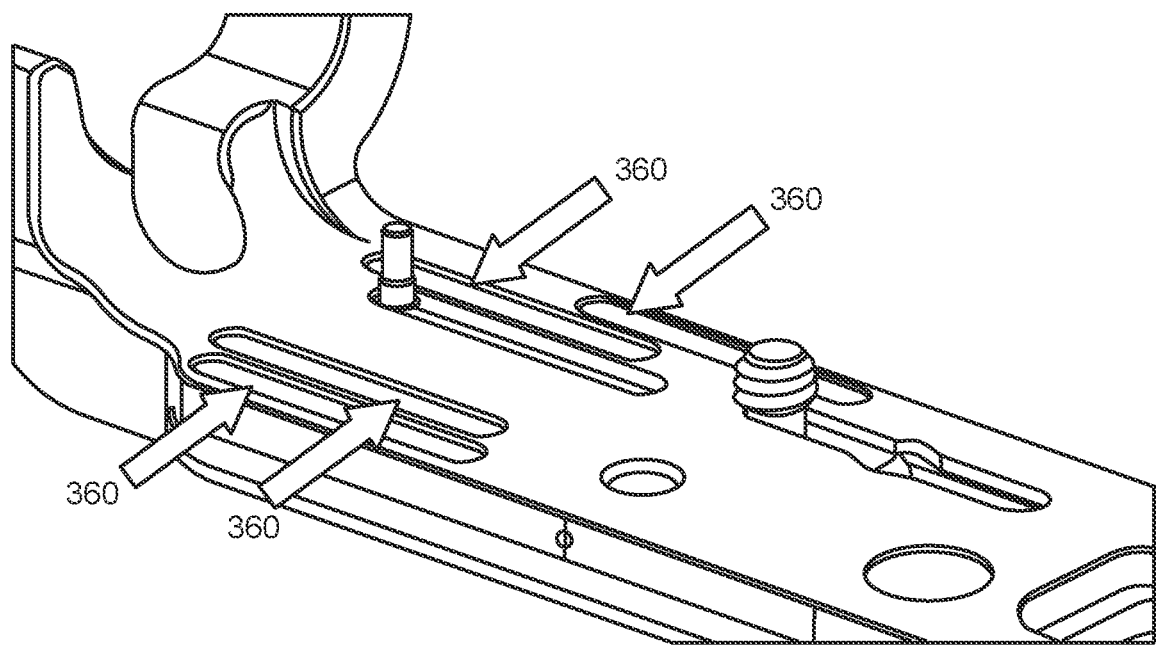
FIG. 33 illustrates an enlarged view of the base plate showing cutouts for the modified L-plate.

Referring to FIG. 33, the base plate 242 includes a plurality of cutout slots 360 to provide clearance for feet of the camera 48.

Figure 34:
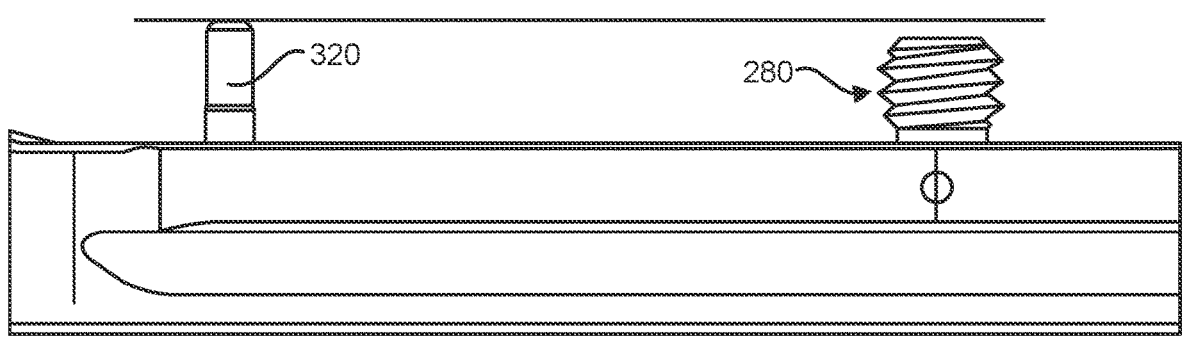
FIG. 34 illustrates a side view of the base plate with a locating pin and a screw.

Referring to FIG. 34, the locating pin 320 has a higher elevation than the mounting screw 280, so that the location pin 320 is properly engaged with the camera 48 first and then the screw 280 is engaged with the camera 48, which reduces the likelihood of improper installation.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A device mounting assembly suitable for adjustably mounting a device on a vertical support comprising:
   (a) a base member configured to support a lower surface of the device and forming an opposite pair of base inclined edges;
   (b) a side member forming an opposite pair of side inclined edges;
   (c) said side member and said base member arranged with respect to one another such that when the lower surface of the device is supported by the base member, at least a portion of the side member is aligned with a side surface of the device and configured such that a pair of moveable jaws of a quick-release mechanism is selectively engageable with the base inclined edges and side inclined edges to adjustably mount the device in a landscape orientation and a portrait orientation, respectively;

(d) wherein a first portion of said base member defines a first elongate slot;

(e) a shuttle that is engageable to and movable longitudinally with respect to said base member;

(f) said shuttle includes a securement member that includes a threaded terminal portion and extends through said first elongate slot;

(g) wherein said shuttle is movable longitudinally relative to said first portion;

(h) wherein a second portion of said base member defines a second elongate slot;

(i) said shuttle includes a locating pin and extends through said second elongate slot when said securement member extends through said first elongate slot;

(j) wherein said locating pin has an elevation with respect to an upper surface of said shuttle that is greater than an elevation of said terminal threaded terminal portion with respect to said upper surface of said shuttle.

2. The device mounting assembly of claim 1 wherein said securement member is a screw.

3. The device mounting assembly of claim 1 wherein said shuttle is said movable relative to a central raised portion while said locating pin is movable within said second elongate slot.

4. The device mounting assembly of claim 1 wherein the diameter of said threaded terminal portion is greater than a portion of the width of said first elongate slot.

5. The device mounting assembly of claim 4 wherein said threaded terminal portion is rotatably engageable with a portion of said first slot in a manner such that said securement member is disengageable from said shuttle.

6. The camera mounting assembly of claim 1 wherein said shuttle includes a pair of shuttle tapered edges.

7. The camera mounting assembly of claim 6 wherein said base includes a pair of base tapered edges.

8. The device mounting assembly of claim 7 wherein said shuttle tapered edges are engageable in a face-to-face arrangement with said base tapered edges when said shuttle is engaged with said base.

9. The device mounting assembly of claim 8 wherein one of said shuttle tapered edges defines an interrupted section proximate said threaded terminal portion.

10. The device mounting assembly of claim 1 wherein said base defines a plurality of additional slots.

11. A device mounting assembly suitable for adjustably mounting a device on a vertical support comprising:

(a) a base member having a first longitudinal axis configured to support a lower surface of the device and forming an opposite pair of base inclined edges;

(b) a side member forming an opposite pair of side inclined edges;

(c) said side member and said base member arranged with respect to one another such that when the lower surface of the device is supported by the base member, at least a portion of the side member is aligned with a side surface of the device and configured such that a pair of moveable jaws of a quick-release mechanism is selectively engageable with the base inclined edges and side inclined edges to adjustably mount the device in a landscape orientation and a portrait orientation, respectively;

(d) wherein a first portion of said base member defines a first elongate slot having a second longitudinal central axis;

(e) a screw that is engageable to and movable longitudinally with respect to said base member;

(f) said screw includes a securement portion that includes a threaded terminal portion and extends above said first elongate slot;

(g) wherein said screw is movable longitudinally relative to said first portion;

(h) wherein a second portion of said base member defines a second elongate slot having a third longitudinal central axis;

(i) a locating pin that extends above said second elongate slot;

(j) wherein said locating pin is movable longitudinally relative to said second portion;

(k) wherein said first longitudinal central axis is aligned with said second longitudinal central axis, said first longitudinal central axis is aligned with said third longitudinal central axis, said second longitudinal central axis is laterally offset from said first longitudinal central axis, said third longitudinal central axis is laterally offset from said first longitudinal central axis, wherein said second longitudinal central axis is offset a different lateral offset distance from said first longitudinal central axis than said third longitudinal central axis is offset from said first longitudinal central axis;

(l) wherein said locating pin has an elevation with respect to an upper surface of said device that is different than an elevation of said terminal threaded portion with respect to said upper surface of said device.

* * * * *